United States Patent
Kung et al.

(10) Patent No.: US 10,169,859 B1
(45) Date of Patent: Jan. 1, 2019

(54) IMAGE INSPECTION DEVICE AND METHOD

(71) Applicant: NOPORVIS CO., LTD., Kaohsiung (TW)

(72) Inventors: Pin-Cheng Kung, Kaohsiung (TW); Kuo-Kai Hung, Tainan (TW); Chun-Neng Chan, Kaohsiung (TW)

(73) Assignee: NOPORVIS CO., LTD., Kaohsiung (TW)

( * ) Notice: Subject to any disclaimer, the term of this patent is extended or adjusted under 35 U.S.C. 154(b) by 11 days.

(21) Appl. No.: 15/663,830

(22) Filed: Jul. 31, 2017

(30) Foreign Application Priority Data

Jun. 29, 2017 (TW) .............................. 106121734 A

(51) Int. Cl.
*H04N 9/47* (2006.01)
*G06T 7/00* (2017.01)
*H04N 5/247* (2006.01)

(52) U.S. Cl.
CPC ............. *G06T 7/001* (2013.01); *H04N 5/247* (2013.01); *G06T 2207/30164* (2013.01)

(58) Field of Classification Search
CPC ................................. G06T 7/001; H04N 5/247
USPC ......................................................... 348/125
See application file for complete search history.

(56) References Cited

U.S. PATENT DOCUMENTS

| 9,865,046 B2 * | 1/2018 | Urano ................... G01N 21/956 |
| 2009/0045335 A1 * | 2/2009 | Obara ................... H01J 37/222 |
| | | 250/306 |
| 2015/0077541 A1 | 3/2015 | Touma | |

FOREIGN PATENT DOCUMENTS

| TW | I470211 B | 1/2015 |
| TW | I477766 B | 3/2015 |

* cited by examiner

*Primary Examiner* — Richard T Torrente
(74) *Attorney, Agent, or Firm* — Winston Hsu

(57) ABSTRACT

An image inspection device includes a rotating platform configured to carry a workpiece; a first image capturing device configured to capture a top-view image of the workpiece; a second image capturing device configured to capture a lateral-view image of the workpiece; a storage unit configured to pre-store a plurality of lateral-view images of a standard workpiece from different angles; and a processing unit. The processing unit controls the rotating platform to rotate the workpiece to a first angle and a second angle according to the top-view image. The processing unit is configured to generate a first comparison result and a second comparison result by comparing the lateral-view images of the workpiece with lateral-view images of the standard workpiece from, respectively, the first angle and the second angle, and determine whether the workpiece has a defect according to the first comparison result and the second comparison result.

8 Claims, 5 Drawing Sheets

IMAGE INSPECTION DEVICE AND METHOD

BACKGROUND OF THE INVENTION

1. Field of the Invention

The present invention relates to an image inspection device and method, and more particularly, to an image inspection device and method for inspecting a workpiece having complex contours.

2. Description of the Prior Art

An inspection method of a blade wheel of a turbocharger manually observes whether the blade wheel has any defects. Since a standard blade wheel has multiple blades with complex contours, it is difficult to observe all possible defects of the blade wheel from one angle. Manually observing the blade wheel from different angles, however, takes a lot of time and is both inefficient and unreliable. In short, the manual inspection method is not able to inspect a blade wheel quickly and efficiently.

SUMMARY OF THE INVENTION

The present invention provides an image inspection device and method in order to solve the problems of the prior art.

According to an embodiment of the present invention, an image inspection device comprises a rotating platform, a first image capturing device, a second image capturing device, a storage unit and a processing unit. The rotating platform is configured to carry a workpiece. The first image capturing device is configured to capture a top-view image of the workpiece. The second image capturing device is configured to capture a lateral-view image of the workpiece. The storage unit is configured to pre-store a plurality of lateral-view images of a standard workpiece taken from different angles. The processing unit is electrically connected to the rotating platform, the first image capturing device, the second image capturing device and the storage unit. The processing unit is configured to control the rotating platform to rotate the workpiece by a first angle and by a second angle according to the top-view image of the workpiece, such that the second image capturing device is able to capture two lateral-view images of a predetermined portion of the workpiece at the first angle and at the second angle, respectively. The processing unit is further configured to generate a first comparison result by comparing the lateral-view images of the predetermined portion of the workpiece at the first angle with the lateral-view images of the predetermined portion of the standard workpiece at the first angle, and generates a second comparison result by comparing the lateral-view images of the predetermined portion of the workpiece at the second angle with the lateral-view images of the predetermined portion of the standard workpiece at the second angle. The processing unit is further configured to determine whether the workpiece has a defect according to the first comparison result and the second comparison result.

According to another embodiment of the present invention, an image inspection method comprises: storing a plurality of lateral-view images of a standard workpiece taken from different angles; placing a workpiece on a rotating platform; capturing a top-view image of the workpiece; controlling the rotating platform to rotate the workpiece to a first angle and to a second angle according to the top-view image of the workpiece, such that a second image capturing device is able to capture two lateral-view images of a predetermined portion of the workpiece at the first angle and at the second angle, respectively; generating a first comparison result by comparing the lateral-view images of the predetermined portion of the workpiece at the first angle with the lateral-view images of the predetermined portion of the standard workpiece at the first angle; generating a second comparison result by comparing the lateral-view images of the predetermined portion of the workpiece at the second angle with the lateral-view images of the predetermined portion of the standard workpiece at the second angle; and determining whether the workpiece has a defect according to the first comparison result and the second comparison result.

In contrast to the prior art, the image inspection device and method of the present invention are capable of rotating the workpiece to a specific angle according to the top-view image of the workpiece, and capable of comparing lateral-view images of the workpiece from different angles with a lateral-view image of the standard workpiece. As a result, the image inspection device and method of the present invention are capable of inspecting a workpiece having complex contours both quickly and efficiently.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
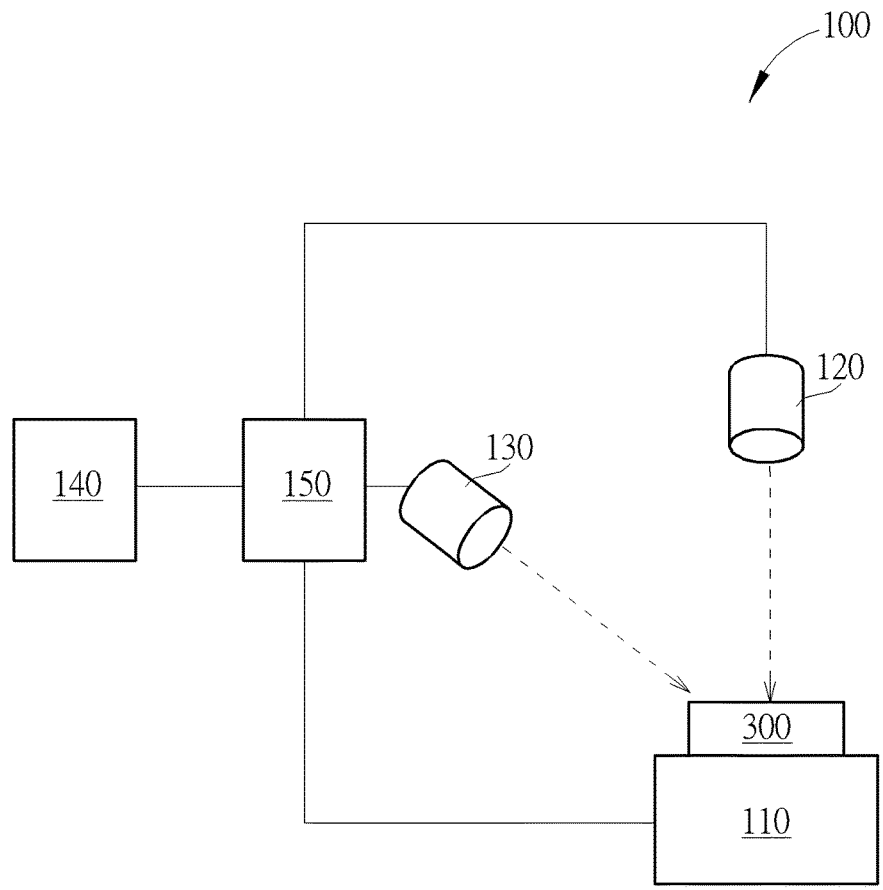
FIG. 1 is a diagram showing an image inspection device of the present invention.

Please refer to FIG. 1, which is a diagram showing an image inspection device 100 of the present invention. The image inspection device 100 comprises a rotating platform 110, a first image capturing device 120, a second image capturing device 130, a storage unit 140 and a processing unit 150. The rotating platform 110 is configured to carry and rotate a work piece 300. The first image capturing device 120 is arranged above the work piece 300 and configured to capture a top-view image of the work piece 300. The second image capturing device 130 is arranged on a lateral side of the work piece 300 and configured to capture a lateral-view image of the work piece 300. In the present embodiment, an angle between an optical axis of the first image capturing device 120 and the horizontal plane is 90 degrees, and an angle between an optical axis of the second image capturing device 130 and the horizontal plane is 30 degrees, but the present invention is not limited thereto. The processing unit 150 is electrically connected to the rotating platform 110, the first image capturing device 120, the second image capturing device 130 and the storage unit 140. The processing unit 150 is configured to control the rotating platform 110 to rotate the work piece 300, such that the second image capturing device 130 is able to capture lateral-view images of a predetermined portion of the workpiece 300 at different angles.

Figure 2:
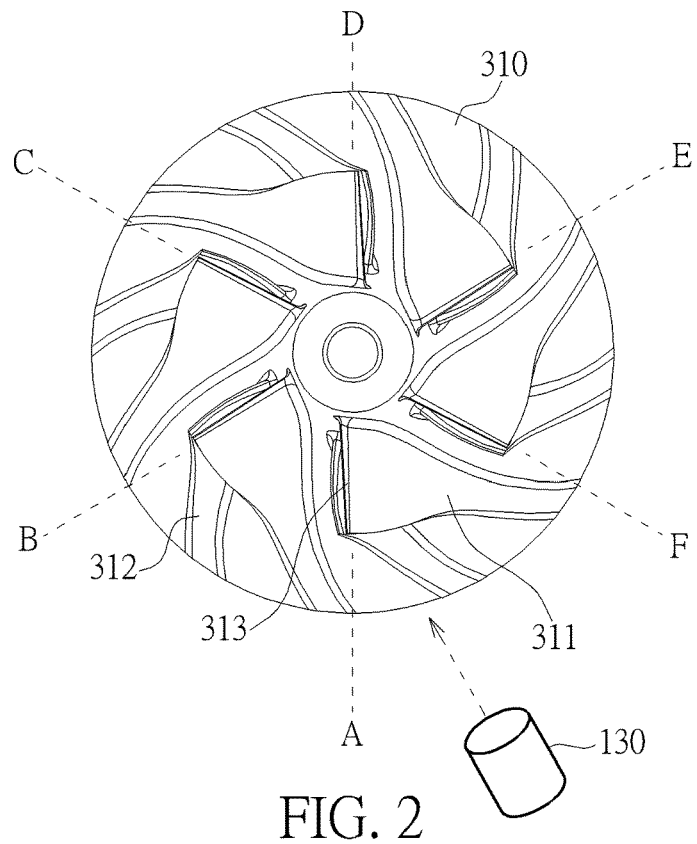
FIG. 2 is a top-view image of a standard workpiece captured by the image inspection device of the present invention.
Figure 3:
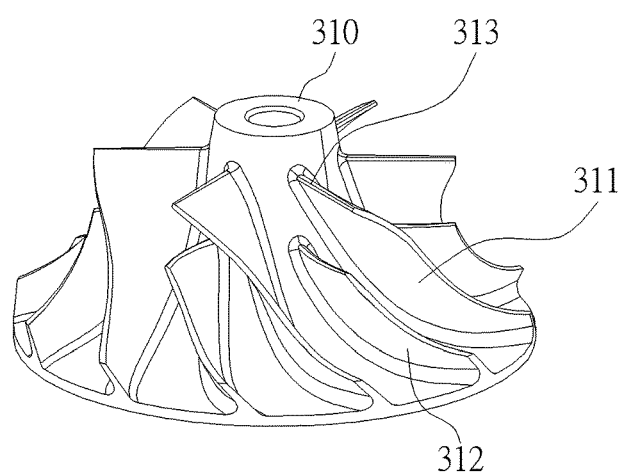
FIG. 3 is a lateral-view image of the standard workpiece captured by the image inspection device of the present invention.

Refer to FIG. 2 and FIG. 3 in conjunction with FIG. 1. FIG. 2 is a top-view image of a standard workpiece captured by the image inspection device of the present invention. FIG. 3 is a lateral-view image of the standard workpiece captured by the image inspection device of the present invention. In the present embodiment, the standard workpiece is a blade wheel 310, comprising six large blades 311 and six small blades 312. The processing unit 150 is configured to position the blade wheel 310 according to the top-view image of the blade wheel 310 captured by the first image capturing device 120. The blade wheel 310 may be located on the rotating platform 110 at any angle. The processing unit 150 is configured to determine characteristics of the blades (such as the ridgeline 313 of the large blade 311) according to the top-view image of the blade wheel 310, in order to control the rotating platform 110 to rotate the blade wheel 310 to different angles (such as angles A to F). The angles A to F are the angles of the ridgeline 313 of the large blade 311 relative to the second image capturing device 130. In the present embodiment, since the blade wheel 310 comprises six large blades 311, the rotating platform 110 rotates the blade wheel 310 to six angles (from angle A to angle F), wherein the difference between one of the angles A to F and the next angle is 60 degrees, but the present invention is not limited thereto. As shown in FIG. 3, the lateral-view image of the blade wheel 310 captured by the second image capturing device 130 only shows some blades, and only shows portions of the blades. For example, FIG. 3 only shows a left portion of the large blade 311 (the marked large blade). Therefore, the image inspection device 100 of the present invention is able to rotate the blade wheel 310 by the rotating platform 110, in order to allow the second image capturing device 130 to capture lateral-view images of the large blade 311 of the blade wheel 310 from different angles. The storage unit 140 is able to store the lateral-view images of the standard workpiece at different angles. The processing unit 150 is configured to determine whether the workpiece has a defect according to a comparison of the lateral-view images of the workpiece and the lateral-view images of the standard workpiece from different angles.

Figure 4:
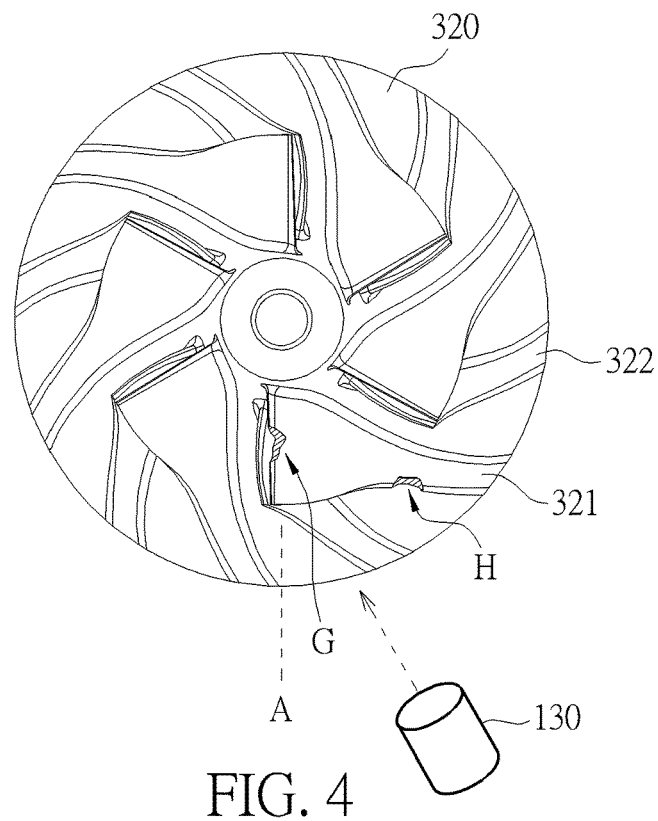
FIG. 4 is a top-view image of a workpiece with defects captured by the image inspection device of the present invention.
Figure 5:
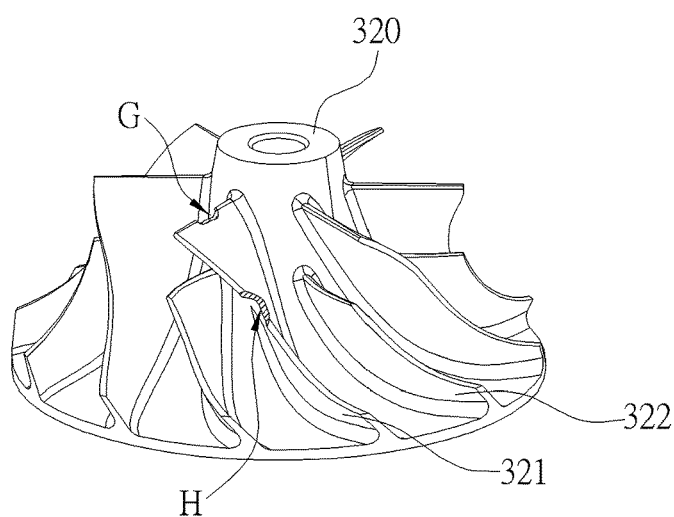
FIG. 5 is a lateral-view image of the workpiece with defects at a first angle captured by the image inspection device of the present invention.
Figure 6:
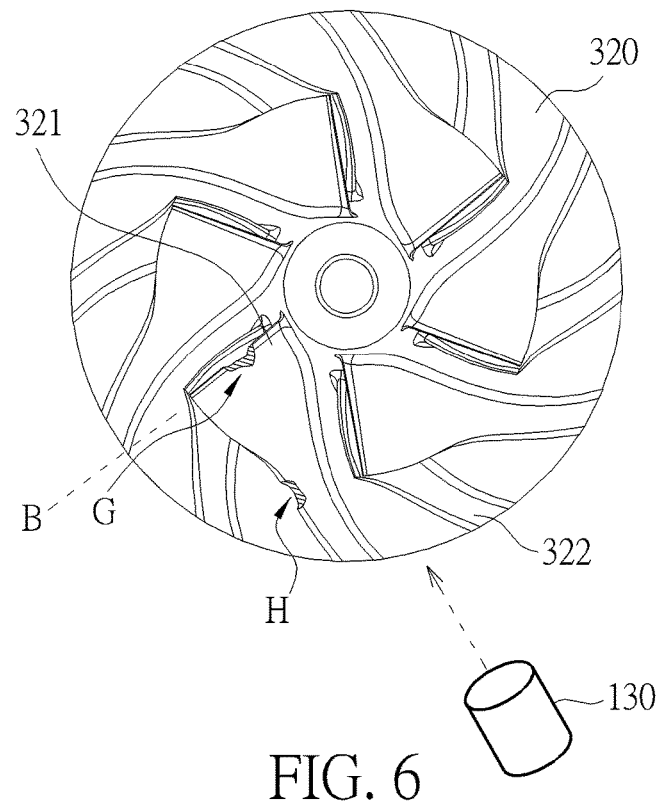
FIG. 6 is a top-view image of a workpiece with defects captured by the image inspection device of the present invention.
Figure 7:
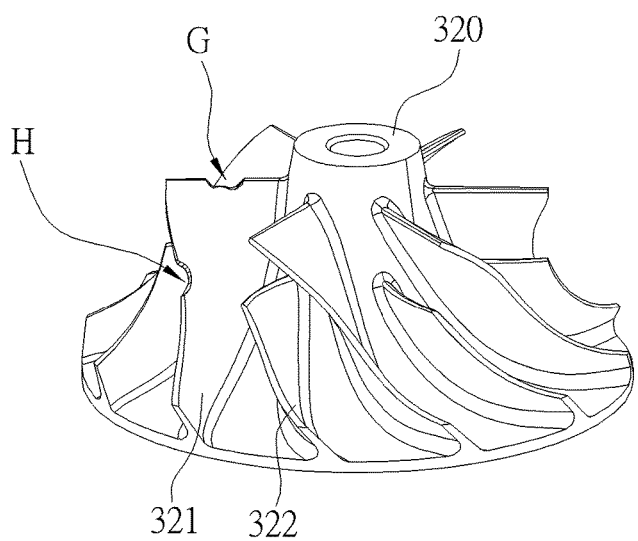
FIG. 7 is a lateral-view image of the workpiece with defects at a second angle captured by the image inspection device of the present invention.

Please refer to FIG. 4 to FIG. 7. FIG. 4 and FIG. 6 are top-view images of a workpiece with defects captured by the image inspection device of the present invention. FIG. 5 and FIG. 7 are lateral-view images of the workpiece with defects captured by the image inspection device from, respectively, a first angle and a second angle. In the present embodiment, the workpiece under inspection is a blade wheel 320, and a defect G and a defect H are formed on a large blade 321 (the marked large blade). As shown in FIG. 4, the image inspection device 100 of the present invention is configured to position the blade wheel 320 according to the top-view image of the blade wheel 320 captured by the first image capturing device 120. The processing unit 150 is configured to determine the characteristics of the blades of the blade wheel 320 according to the top-view image of the blade wheel 320, in order to control the rotating platform 110 to rotate the large blade 321 of the blade wheel 320 to angle A. As shown in FIG. 5, the second image capturing device 130 captures a lateral-view image of the blade wheel 320 from the angle A. The processing unit 150 is further configured to generate a first comparison result by comparing the lateral-view image of the blade wheel 320 with the lateral-view image of the standard workpiece at angle A. The first comparison result is a value of image similarity percentage. If the image similarity of the lateral-view image of the blade wheel 320 at angle A and the lateral-view image of the standard workpiece at angle A is high, the value of the first comparison is high. The processing unit 150 is further configured to determine whether the blade wheel 320 has a defect by comparing the first comparison result with a first threshold value. The first threshold value is a predetermined value and configured to determine whether the workpiece (such as the blade wheel 320) has a defect.

In FIG. 5, the defect G and the defect H of the large blade 321 are only partially shown in the lateral-view image of the blade wheel 320 at the angle A. As shown in FIG. 6, after the second image capturing device 130 captures the lateral-view image of the blade wheel 320 at angle A, the processing unit 150 is configured to control the rotating platform 110 to rotate the large blade 321 (the marked large blade) of the blade wheel 320 to an angle B according to the top-view image of the blade wheel 320. As shown in FIG. 7, the second image capturing device 130 captures a lateral-view image of the blade wheel 320 from the angle B. The lateral-view image of the blade wheel 320 from the angle B is able to show the portions not shown in the lateral-view image from the angle A. Similarly, the processing unit 150 is configured to generate a second comparison result by comparing the lateral-view image of the blade wheel 320 with the lateral-view image of the standard workpiece at angle B, and the processing unit 150 is further configured to determine whether the blade wheel 320 has a defect by comparing the second comparison result with a second threshold value. In the present embodiment, when the first comparison result is smaller than the first threshold vale and the second comparison result is smaller than the second threshold vale, the processing unit 150 determines the blade wheel 320 has a defect, but the present invention is not limited thereto.

In addition, the image inspection device 100 of the present invention is able to compare a small blade 322 of the blade wheel 320 with the standard workpiece at different angles to determine whether the small blade 322 of the blade wheel 320 has a defect when comparing the large blade 321 of the blade wheel 320 with the standard workpiece. The inspected portion can be arranged according to different requirements. Moreover, after the processing unit 150 determines whether the large blade 321 (the marked large blade) of the blade wheel 320 has a defect, the processing unit 150 controls the rotating platform 110 to further rotate the blade wheel 320, in order to allow the second image capturing device 130 to capture lateral-view images of other large blades 321 and other small blades 322 of the blade wheel 320 from different angles. The processing unit 150 is thereby able to further compare the lateral-view images of other large blades 321 and other small blades 322 of the blade wheel 320 with lateral-view images of the standard workpiece. According to the above arrangement, the image inspection device 100 of the present invention is capable of inspecting a workpiece from different angles to determine whether the workpiece has a defect, and solve the prior art problem of lack of inspection accuracy.

Please refer to FIG. 1 again. In another embodiment of the present invention, the storage unit 140 is further configured to pre-store a top-view image of the standard workpiece. The processing unit 150 is further configured to generate a third comparison result by comparing the top-view image of the workpiece 300 with the top-view image of the standard workpiece, and determine whether the workpiece 300 has a defect according to the first comparison result, the second comparison result and the third comparison result. The top-view image of the workpiece 300 captured by the first image capturing device 120 is not only utilized as positioning means by the processing unit 150, but also for comparison with the top-view of the standard workpiece, such that the workpiece 300 can be inspected by images captured at more angles.

In the present invention, the above first threshold vale and second threshold value can be generated according to statistical values of a plurality of image similarities of the lateral-view images of the predetermined portion of a plurality of predetermined workpieces and the lateral-view image of the predetermined portion of the standard workpiece. For example, the processing unit 150 is configured to generate the first threshold value according to a standard deviation value of the plurality of image similarities of the lateral-view images of the predetermined portion of the plurality of predetermined workpieces from the first angle and the lateral-view image of the predetermined portion of the standard workpiece from the first angle, and generates the second threshold value according to a standard deviation value of the plurality of the image similarities of the lateral-view images of the predetermined portion of the plurality of predetermined workpieces from the second angle and the lateral-view image of the predetermined portion of the standard workpiece from the second angle. The processing unit 150 is further configured to compare the first comparison result with the first threshold value and compare the second comparison result with the second threshold value, in order to determine whether the workpiece has a defect. In the present embodiment, the first threshold value and the second threshold value are twice the standard deviation values, but the present invention is not limited thereto. The multiple values of the standard deviation value can be arranged according to different requirements. When the top-view image is further configured to be compared to generate a third comparison result, the processing unit 150 is further configured to generate the third threshold value according to a standard deviation value of the plurality of the image similarities of the top-view images of the plurality of predetermined workpieces and the top-view image of the standard workpiece, and compares the third comparison result with the third threshold value to determine whether the workpiece has a defect.

Figure 8:
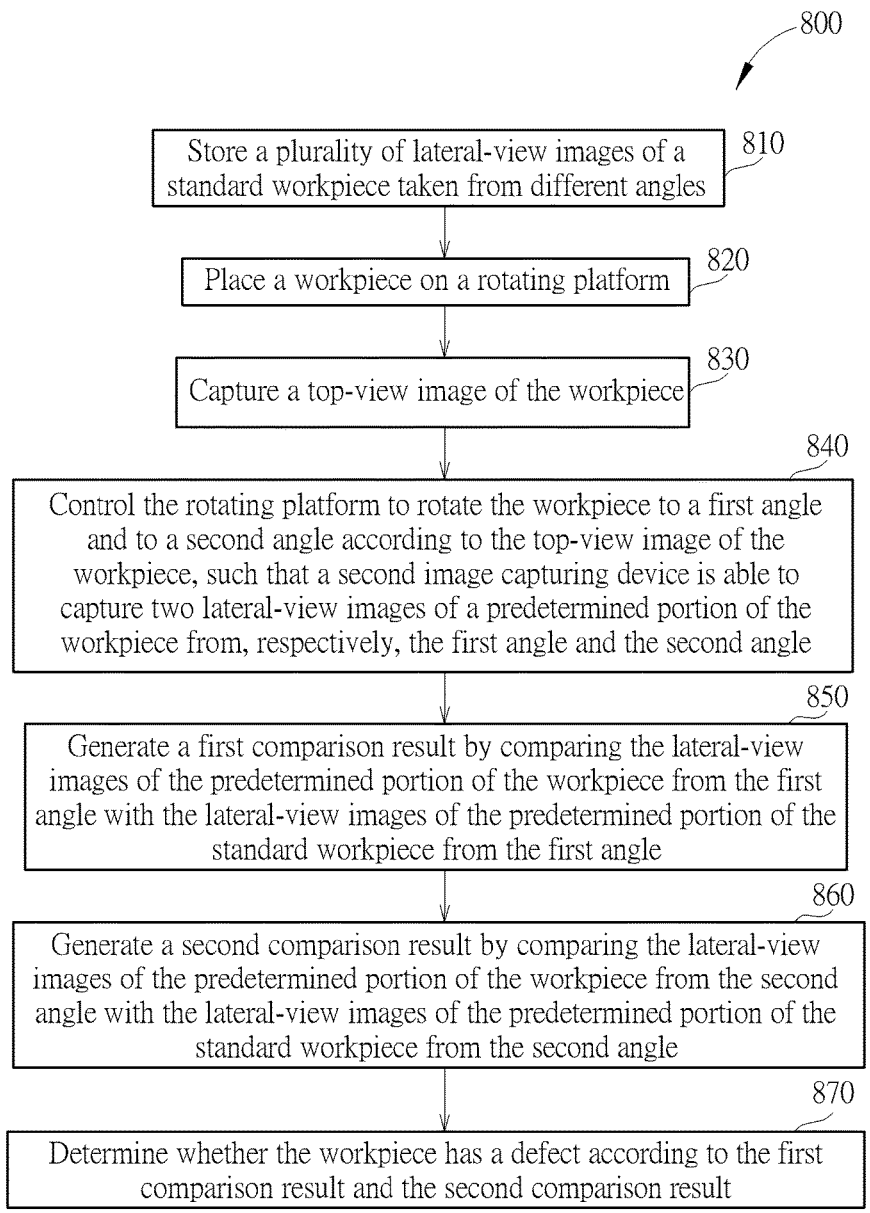
FIG. 8 is a flowchart showing the image inspection method of the present invention.

Please refer to FIG. 8, which is a flowchart 800 showing the image inspection method of the present invention. The flowchart 800 comprises the following steps:

Step 810: store a plurality of lateral-view images of a standard workpiece taken from different angles;

Step 820: place a workpiece on a rotating platform;

Step 830: capture a top-view image of the workpiece;

Step 840: control the rotating platform to rotate the workpiece to a first angle and to a second angle according to the top-view image of the workpiece, such that a second image capturing device is able to capture two lateral-view images of a predetermined portion of the workpiece from, respectively, the first angle and the second angle;

Step 850: generate a first comparison result by comparing the lateral-view images of the predetermined portion of the workpiece from the first angle with the lateral-view images of the predetermined portion of the standard workpiece from the first angle;

Step 860: generate a second comparison result by comparing the lateral-view images of the predetermined portion of the workpiece from the second angle with the lateral-view images of the predetermined portion of the standard workpiece from the second angle; and Step 870: determine whether the workpiece has a defect according to the first comparison result and the second comparison result.

The image inspection method of the present invention is not limited to the above steps - other steps can be added to the image inspection method, and the sequence of the steps is not limited to the above.

In contrast to the prior art, the image inspection device and method of the present invention are capable of rotating the workpiece to a specific angle according to the top-view image of the workpiece, and capable of comparing lateral-view images of the workpiece from different angles with a lateral-view image of the standard workpiece. As a result, the image inspection device and method of the present invention are capable of inspecting a workpiece having complex contours both quickly and efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image inspection device, comprising:
a rotating platform configured to carry a workpiece;
a first image capturing device configured to capture a top-view image of the workpiece;
a second image capturing device configured to capture a lateral-view image of the workpiece;
a storage unit configured to pre-store a plurality of lateral-view images of a standard workpiece from different angles; and
a processing unit electrically connected to the rotating platform, the first image capturing device, the second image capturing device and the storage unit;
wherein the processing unit is configured to control the rotating platform to rotate the workpiece to a first angle and to a second angle according to the top-view image of the workpiece, such that the second image capturing device is able to capture two lateral-view images of a predetermined portion of the workpiece from, respectively, the first angle and the second angle;
wherein the processing unit is further configured to generate a first comparison result by comparing the lateral-view images of the predetermined portion of the workpiece from the first angle with the lateral-view images of the predetermined portion of the standard workpiece from the first angle, and generate a second comparison result by comparing the lateral-view images of the predetermined portion of the workpiece from the second angle with the lateral-view images of the predetermined portion of the standard workpiece from the second angle;
wherein the processing unit is further configured to determine whether the workpiece has a defect according to the first comparison result and the second comparison result;
wherein the processing unit is further configured to generate a first threshold value according to a plurality of image similarities of the lateral-view images of the predetermined portion of a plurality of predetermined workpieces from the first angle and the lateral-view image of the predetermined portion of the standard workpiece from the first angle, and to generate a second threshold value according to a plurality of image similarities of the lateral-view images of the predetermined portion of a plurality of predetermined workpieces from the second angle and the lateral-view image of the predetermined portion of the standard workpiece from the second angle;

wherein the storage unit is further configured to pre-store a top-view image of a standard workpiece, and the processing unit is further configured to generate a third comparison result by comparing the top-view images of the workpiece with the top-view images of the standard workpiece, and determines whether the workpiece has a defect according to the first comparison result, the second comparison result and the third comparison result.

2. The image inspection device of claim 1, wherein an angle between an optical axis of the first image capturing device and the horizontal plane is 90 degrees and an angle between an optical axis of the second image capturing device and the horizontal plane is 30 degrees.

3. The image inspection device of claim 1, wherein the first threshold value is a multiple value of a standard deviation value of the plurality of the image similarities of the lateral-view images of the predetermined portion of the plurality of predetermined workpieces from the first angle and the lateral-view image of the predetermined portion of the standard workpiece from the first angle, and the second threshold value is a multiple value of a standard deviation value of the plurality of the image similarities of the lateral-view images of the predetermined portion of the plurality of predetermined workpieces from the second angle and the lateral-view image of the predetermined portion of the standard workpiece from the second angle.

4. The image inspection device of claim 1, wherein the processing unit is further configured to determine whether the workpiece has a defect by comparing the first comparison result with the first threshold value and comparing the second comparison result with the second threshold value.

5. An image inspection method, comprising:
storing a plurality of lateral-view images of a standard workpiece taken from different angles;
placing a workpiece on a rotating platform;
capturing a top-view image of the workpiece;
controlling the rotating platform to rotate the workpiece to a first angle and to a second angle according to the top-view image of the workpiece, such that a second image capturing device is able to capture two lateral-view images of a predetermined portion of the workpiece from, respectively, the first angle and the second angle;
generating a first comparison result by comparing the lateral-view images of the predetermined portion of the workpiece from the first angle with the lateral-view images of the predetermined portion of the standard workpiece from the first angle;
generating a second comparison result by comparing the lateral-view images of the predetermined portion of the workpiece from the second angle with the lateral-view images of the predetermined portion of the standard workpiece from the second angle;
determining whether the workpiece has a defect according to the first comparison result and the second comparison result;
generating a first threshold value according to a plurality of image similarities of the lateral-view images of the predetermined portion of a plurality of predetermined workpieces from the first angle and the lateral-view image of the predetermined portion of the standard workpiece from the first angle;
generating a second threshold value according to a plurality of image similarities of the lateral-view images of the predetermined portion of a plurality of predetermined workpieces from the second angle and the lateral-view image of the predetermined portion of the standard workpiece from the second angle;
storing top-view images of a standard workpiece;
generating a third comparison result by comparing the top-view images of the workpiece with the top-view images of the standard workpiece; and
determining whether the workpiece has a defect according to the first comparison result, the second comparison result and the third comparison result.

6. The image inspection method of claim 5, wherein an angle between an optical axis of the first image capturing device and the horizontal plane is 90 degrees and an angle between an optical axis of the second image capturing device and the horizontal plane is 30 degrees.

7. The image inspection method of claim 5, wherein the first threshold value is a multiple value of a standard deviation value of the plurality of the image similarities of the lateral-view images of the predetermined portion of the plurality of predetermined workpieces from the first angle and the lateral-view image of the predetermined portion of the standard workpiece from the first angle, and the second threshold value is a multiple value of a standard deviation value of the plurality of the image similarities of the lateral-view images of the predetermined portion of the plurality of predetermined workpieces from the second angle and the lateral-view image of the predetermined portion of the standard workpiece from the second angle.

8. The image inspection method of claim 5, wherein the processing unit determines whether the workpiece has a defect by comparing the first comparison result with the first threshold value and comparing the second comparison result with the second threshold value.

* * * * *